(12) United States Patent
Shi et al.

(10) Patent No.: US 12,476,824 B2
(45) Date of Patent: Nov. 18, 2025

(54) INFORMATION INTERACTION METHOD AND DEVICE, STORAGE MEDIUM

(71) Applicant: BEIJING XIAOMI MOBILE SOFTWARE CO., LTD., Beijing (CN)

(72) Inventors: Xinling Shi, Beijing (CN); Mingqi Ju, Beijing (CN); Shuangquan Pan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 289 days.

(21) Appl. No.: 18/373,939

(22) Filed: Sep. 27, 2023

(65) Prior Publication Data
US 2025/0007728 A1    Jan. 2, 2025

(30) Foreign Application Priority Data
Jun. 30, 2023    (CN) .......................... 202310799148.5

(51) Int. Cl.
*H04L 9/32*    (2006.01)
(52) U.S. Cl.
CPC .......... *H04L 9/3247* (2013.01); *H04L 9/3271* (2013.01)
(58) Field of Classification Search
None
See application file for complete search history.

(56) References Cited

U.S. PATENT DOCUMENTS

| | | | |
|---|---|---|---|
| 9,805,201 B2* | 10/2017 | Miller | G06F 21/31 |
| 10,235,517 B2* | 3/2019 | Lao | G06F 21/73 |
| 10,911,245 B2* | 2/2021 | Pottier | H04L 9/3226 |
| 2010/0306538 A1 | 12/2010 | Thomas et al. | |

FOREIGN PATENT DOCUMENTS

WO    2008002081 A1    1/2008

OTHER PUBLICATIONS

Extended European Search Report issued in Application No. 23207397.3 dated Apr. 10, 2024, (7p).

* cited by examiner

*Primary Examiner* — Jeffrey C Pwu
*Assistant Examiner* — Mayasa A. Shaawat
(74) *Attorney, Agent, or Firm* — Arch & Lake LLP

(57) ABSTRACT

An information interaction method includes: sending, by a first device in response to a need to send an authorization request message to a second device, first security authentication information to the second device, where the first security authentication information is configured for the second device to evaluate whether the first device is a trusted device; evaluating, by the first device, whether the second device is a trusted device based on second security authentication information sent by the second device; obtaining, by the first device in response to determining mutual trust with the second device, an authorization pass message sent by the second device based on the authorization request message, where the authorization pass message is configured to authorize the first device to access the second device; and sending, by the first device, an access request message to the second device based on the authorization pass message, thereby requesting access to information on the second device.

14 Claims, 10 Drawing Sheets

INFORMATION INTERACTION METHOD AND DEVICE, STORAGE MEDIUM

CROSS REFERENCE TO RELATED APPLICATION

The present application claims the benefit of priority to Chinese Patent Application No. 202310799148.5, filed on Jun. 30, 2023, the entire disclosure of which is incorporated herein by reference for all purposes.

BACKGROUND

Currently, if a device is to access another device, the other device can perform authentication by using a cryptographic key, so as to ensure the security of the device requesting access to a certain extent.

SUMMARY

The present disclosure relates to the field of communications, and more specifically, to an information interaction method and device, and a storage medium. In order to overcome the problems existing in the related technologies, the present disclosure provides an information interaction method and device, and a storage medium.

According to a first aspect of the present disclosure, an information interaction method is provided and includes: sending, by a first device in response to a need to send an authorization request message to a second device, first security authentication information to the second device, where the first security authentication information is configured for the second device to evaluate whether the first device is a trusted device; evaluating, by the first device, whether the second device is a trusted device based on second security authentication information sent by the second device; obtaining, by the first device in response to determining mutual trust with the second device, an authorization pass message sent by the second device based on the authorization request message, where the authorization pass message is configured to authorize the first device to access the second device; and sending, by the first device, an access request message to the second device based on the authorization pass message, thereby requesting access to information on the second device.

According to a second aspect of the present disclosure, an information interaction method is provided and includes: evaluating, by a second device, whether a first device is a trusted device based on first security authentication information sent by the first device; sending, by the second device, second security authentication information to the first device, where the second security authentication information is configured for the first device to evaluate whether the second device is a trusted device; sending, by the second device in response to determining mutual trust with the first device, an authorization pass message to the first device, where the authorization pass message is configured to authorize the first device to access the second device; and providing, by the second device based on an access request message sent by the first device, the first device with information requested for access by the first device.

According to a third aspect of the present disclosure, an information interaction apparatus is provided and includes: a processor; and a memory for storing instructions executable by the processor; wherein the processor is configured to perform acts comprising: sending, in response to a need to send an authorization request message to a second device, first security authentication information to the second device, where the first security authentication information is configured for the second device to evaluate whether the first device is a trusted device; evaluating whether the second device is a trusted device based on second security authentication information sent by the second device; obtaining, in response to determining mutual trust with the second device, an authorization pass message sent by the second device based on the authorization request message, where the authorization pass message is configured to authorize the first device to access the second device; and sending an access request message to the second device based on the authorization pass message, thereby requesting access to information on the second device.

It is to be understood that both the foregoing general description and the following detailed description are exemplary and explanatory only, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1A:
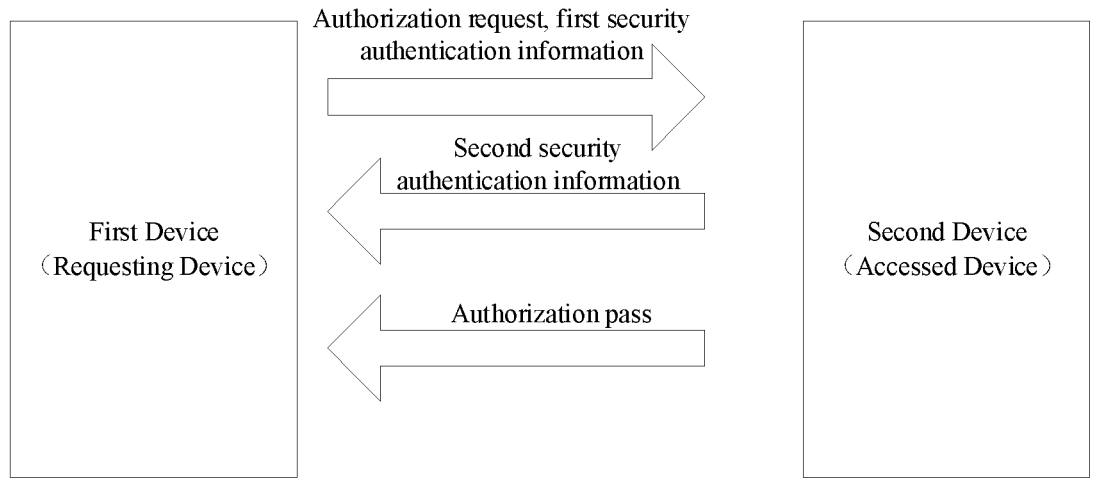
FIG. 1A is a flowchart of an information interaction method according to an embodiment of the present disclosure.

Description will now be made in detail to embodiments, examples of which are illustrated in the accompanying drawings. The following description refers to the accompanying drawings in which the same numbers in different drawings represent the same or similar elements unless otherwise indicated. The implementations in the following description of embodiments do not represent all implementations consistent with the present disclosure.

Nouns or terms involved in the present disclosure will be introduced first before describing the solutions according to the present disclosure.

First device (may also be called a requesting device), refers to a device that initiates an interconnection request and is connected to the accessed device.

Second device (may also be called an accessed device), refers to a device that receives the interconnection request and is connected to the requesting device.

Challenge value ("challenge"), generated based on random numbers and used to prevent replay attacks.

Replay attack, also known as repeat attack and playback attack, refers to achieving the purpose of deceiving a system by an attacker sending a packet that has been received by a destination host. It is mainly used in the identity authentication process to destroy the correctness of authentication.

Trust state information, refers to device state information used to prevent attackers from tampering with device information, including but not limited to the root user ("root") of the device, the number of flashes, device security state, and the like.

Profile information ("action_info"), refers to information collected by the accessed device to profile behavior of the requesting device.

Device root certificate, refers to a unique certificate for each device stored in a trusted environment. It is used to ensure the integrity of information when interacting with other devices and to sign the transmitted information.

The reason why authorization is required between devices is to ensure that the operation of the "requesting device" is approved by the "accessed device", so as to ensure that the access permission(s) of the "accessed device" are within the scope of the user's permission.

Authorization actions often occur during connection matching, data transmission, and function invocation. For example, user authorization is required when the "requesting device" requests to connect with the "accessed device"; user authorization is also required when the "requesting device" requests to access some data, such as pictures, text messages, etc., on the "accessed device"; and user authorization is also required when the "requesting device" requests to call some functions, such as payment, camera, games, etc., on the "accessed device".

During authorization, the "requesting device" needs to provide its own security state, and use cryptographic algorithms to ensure that it is not eavesdropped or tampered with in the transmission channel, so as to make the "accessed device" trust the "requesting device" and provide authorization.

However, the "accessed device" cannot permanently trust the "requesting device", so the authorization needs to have a certain validity period, and the authorization for different application scenarios may need to have different authorization periods. The authorization period may be evaluated based on the degree of dependence on security. For example, the payment function may require authorization every time it is called; the function of accessing pictures may require authorization every fixed period; and the function of viewing the clock may not require authorization or only require authorization once.

Generally, if a device is to access another device, the other device can perform authentication by using a cryptographic key, so as to ensure the security of the device requesting access to a certain extent. However, the above process has the following problems:

First, the two parties in the interaction have a low level of mutual trust. For example, when the first party's device has been hacked and is in a state of insecurity, the second party should be informed that the first party's device is in the state of insecurity. However, often in this case, the information sent may be tampered with, which makes the information obtained by the second party untrustworthy.

Second, the security of the first party's device can be confirmed only for the moment by using the cryptographic key for authentication, which cannot guarantee that the first party's device is always in a state of security.

Therefore, the above process cannot provide a sufficiently trustworthy state of security.

In some embodiments of the present disclosure, referring to FIG. 1A, a schematic flowchart of information interaction method is provided. The first device may be the device that initiates an access request message, which may be the "requesting device" in FIG. 1A.

The second device may be the device requested for access, which may be the "accessed device" in FIG. 1A.

In some embodiments, the requesting device may send the authorization request message to the accessed device, where the authorization request message includes first security authentication information, and the first security authentication information is used by the accessed device to evaluate whether the requesting device is a trusted device.

In some embodiments, the accessed device may send second security authentication information to the requesting device, so that the requesting device can evaluate whether the accessed device is a trusted device.

In some embodiments, after mutual trust is determined by the two devices, the requesting device obtains an authorization pass message sent by the accessed device based on the authorization request message, and initiates an access request message to the accessed device, so as to request access to information on the accessed device.

In some embodiments, the security and trust level between devices is improved, so that the trust level of the devices of both parties is at a higher level, so as to ensure the security and reliability of information interaction across smart devices.

Figure 1B:
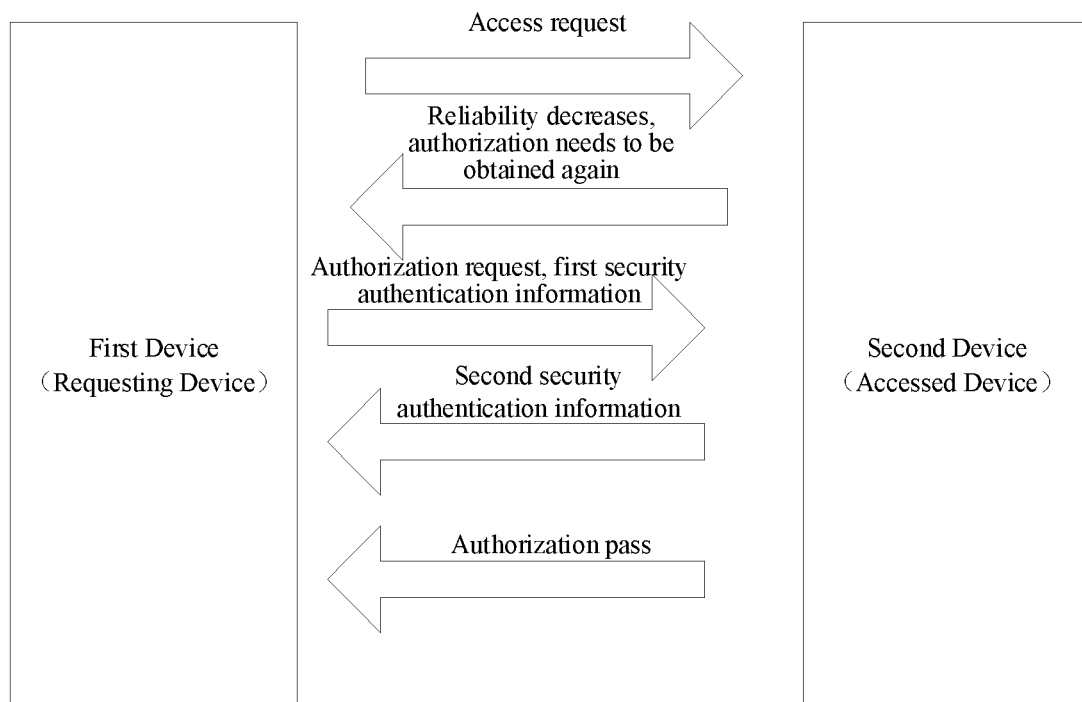
FIG. 1B is a flowchart of another information interaction method according to an embodiment of the present disclosure.

In some embodiments of the present disclosure, as shown in FIG. 1B, a schematic flowchart of information interaction is provided. After the accessed device authorizes, the two devices may still need to maintain a state of suspicion. Once the accessed device considers that the reliability of the requesting device decreases, the requesting device is required to initiate an authorization request message again.

In some embodiments, the security and trust level between devices is improved, so that the trust level of the devices of both parties is at a higher level, so as to ensure the security and reliability of information interaction across smart devices.

The information interaction method according to the present disclosure will be firstly described below from the first device side.

Figure 2:
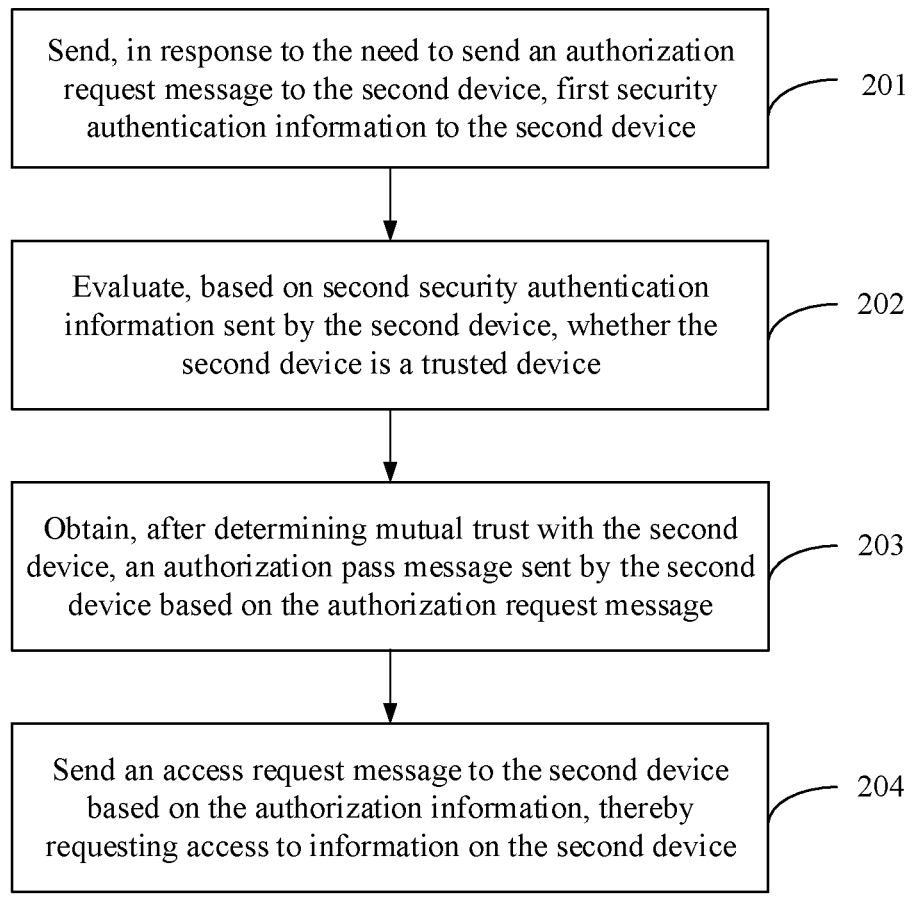
FIG. 2 is a flowchart of another information interaction method according to an embodiment of the present disclosure.

Referring to FIG. 2, FIG. 2 is a flowchart of an information interaction method illustrating an embodiment of the present disclosure. This embodiment is described from the first device side. The first device is a device that initiates an access request message, which may include but not limited to a mobile phone, a laptop, a desktop computer, and a tablet computer. As shown in FIG. 2, the information interaction method may include the following steps.

In step 201, in response to the need to send an authorization request message to the second device, first security authentication information is sent to the second device.

In some embodiments of the present disclosure, when the first device receives an access request message initiated by the user and requests access to the second device, the first device determines that it needs to send the authorization request message to the second device.

In some embodiments of the present disclosure, the first security authentication information is used by the second device to evaluate whether the first device is a trusted device.

In some examples, the first device and the second device need to perform signature verification on each other first, and then generate the first security authentication information when both signature verifications pass.

For example, the first device may send first signature information to be verified to the second device, and the first signature information to be verified is used by the second device to perform signature verification on the first device to obtain a first signature verification result.

In some embodiments, the first signature information to be verified includes: a first challenge value randomly generated by the first device; and a first signature value signed by the first device.

For example, the first device obtains the first signature value signed by the first device by signing the randomly generated first challenge value based on its own root certificate.

In addition, the first device may obtain a second signature verification result by performing signature verification on the second device based on second signature information to be verified sent by the second device.

In some embodiments, the second signature information to be verified includes: a second challenge value randomly generated by the second device; and a second signature value signed by the second device.

For example, the second device obtains the second signature value signed by the second device by signing the randomly generated second challenge value based on its own root certificate.

The signature verification process on the second device may include: decrypting the second signature value signed by the second device based on a public key of the second device to obtain a decrypted second signature value; and, if the decrypted second signature value is completely consistent with a second challenge value sent by the second device, determining that the second signature verification result passes, that is, the second challenge value has not been tampered with.

Further, when the first signature verification result obtained by the second device also passes, that is, when the first challenge value randomly generated by the first device has not been tampered with, the first device can generate the first security authentication information.

For example, the first device obtains the first security authentication information by combining the second challenge value with first trust state information of the first device. The first trust state information may include but not limited to the root of the first device, the number of flashes, the security state of the first device, and the like.

Further, the first device may send the generated first security authentication information to the second device.

In some examples, in order to improve the security of the first security authentication information, the first security authentication information may be signed again based on the root certificate of the first device, and both the first security authentication information and the signed first security authentication information are sent to the second device.

In step 202, based on second security authentication information sent by the second device, it is evaluated whether the second device is a trusted device.

In some embodiments of the present disclosure, the execution order of the above steps 201 and 202 is not limited.

In some embodiments of the present disclosure, the process of the second device generating the second security authentication information is similar to the process of the first device generating the first security authentication information in step 201, and will not be repeated here.

In some embodiments, the second security authentication information includes the first challenge value; and second trust state information of the second device.

In some embodiments, the second trust state information includes but is not limited to the root of the second device, the number of flashes, the security state of the second device, and the like.

The first device may determine whether there is a replay attack by comparing the first challenge value included in the second security authentication information with a first challenge value previously randomly generated by the first device. If the two first challenge values are completely consistent, it is determined that there is no replay attack. If the two challenge values are inconsistent, it is determined that there is a replay attack.

If it is determined that a replay attack exists, the first device may stop the authorization request process.

In some examples, if there is no replay attack, the first device may send the second trust state information of the second device to a first application on the first device, where the first application is an application that requests access to the second device on the first device, and is configured to evaluate whether the second device is a trusted device based on the second trust state information.

For example, the first application determines that the root of the second device has not been changed, and considers that the second device is a trusted device.

For example, the first application determines that the number of times the second device has been flashed is less than or equal to a preset number, and considers that the second device is a trusted device.

For example, the first application determines the security state of the second device to be reliable, and considers that the second device is a trusted device.

For example, the first application determines that the root of the second device has been changed, and/or the number of times of flashing is greater than the preset number, and/or the security state of the second device is unreliable, and considers that the second device is not a trusted device.

In some embodiments of the present disclosure, the second device uses a similar method to evaluate whether the first device is a trusted device.

In some examples, the first device receives the second security authentication information and information generated by signing the second security authentication information at the second device based on its own root certificate.

The first device first performs signature verification and determines that the second security authentication information has not been changed, and then evaluates whether the second device is a trusted device based on the second security authentication information.

For example, the first device may decrypt, based on a public key of the second device, the information generated by signing second security authentication information at the second device. If the decrypted second security authentication information is consistent with the second security authentication information sent by the second device, it is determined that the signature verification passes, that is, the second security authentication information has not been changed.

In step 203, after determining mutual trust with the second device, an authorization pass message sent by the second device based on the authorization request message is obtained.

In some embodiments of the present disclosure, the first device determines that the second device is a trusted device after the evaluation, and the second device determines that the first device is a trusted device after the evaluation. Then the first device can obtain the authorization pass message sent by the second device.

In some embodiments of the present disclosure, the authorization message is used to authorize the first device to access the second device.

In step 204, an access request message is sent to the second device based on the authorization pass message, so as to request access to information on the second device.

For example, the access request message may request access to pictures, files, other data information, and the like on the second device.

In some embodiments, devices can exchange security authentication information to authenticate whether the peer device is a trusted device. After the devices trust each other, the device requested for access sends authorization pass message to the device initiating the access request message, so as to improve the trust level of security state between devices, keeping the trust level of both devices at a higher level, and ensuring the security and reliability of information interaction across smart devices.

Figure 3:
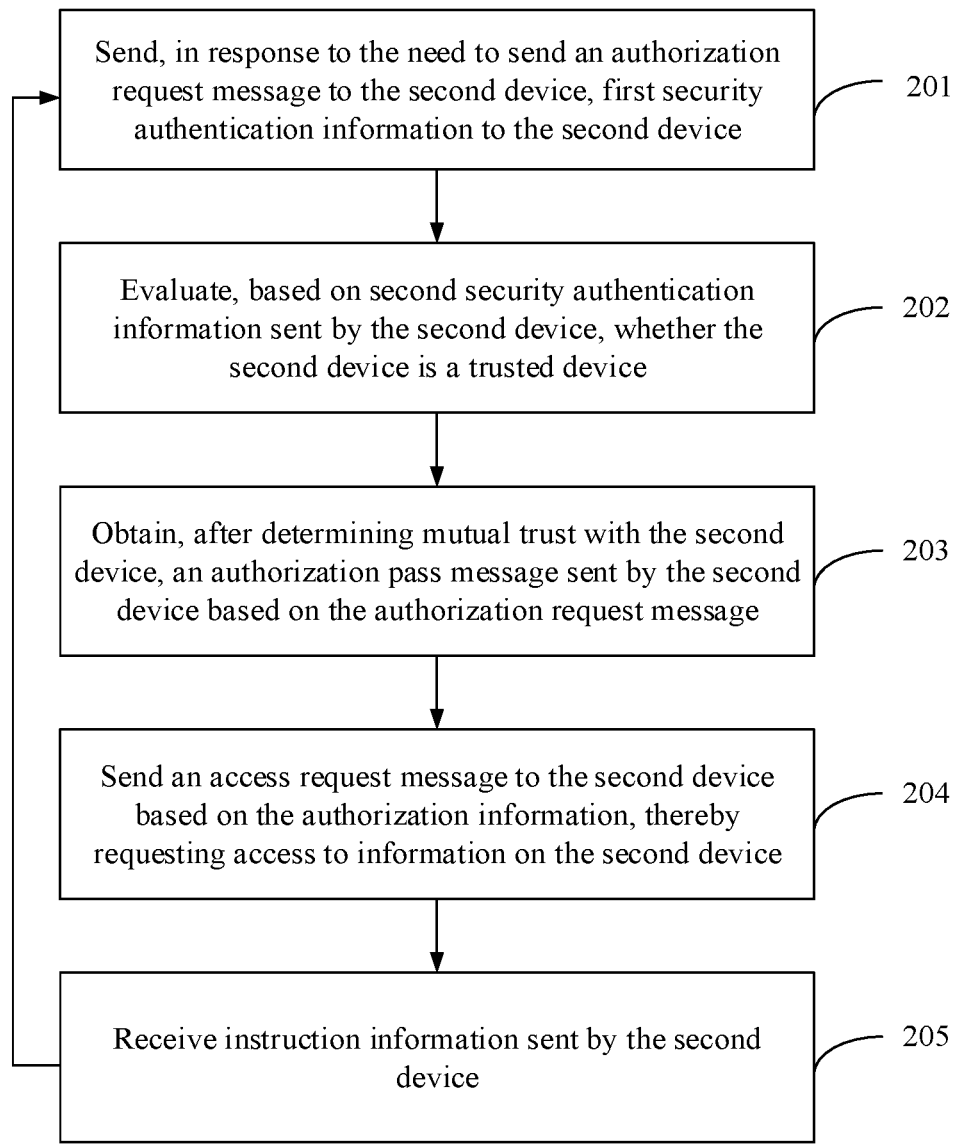
FIG. 3 is a flowchart of another information interaction method according to an embodiment of the present disclosure.

In some embodiments, referring to FIG. 3, which is a flowchart of an information interaction method according to some embodiments of FIG. 2 in the present disclosure. The information interaction method may further include the following steps.

In step 205, instruction information sent by the second device is received.

In some embodiments of the present disclosure, during the access process of the first device, the second device continues to profile behavior of the first device, determines a current behavior of the first device to be matched with the profile result, and obtains a matching result for use in evaluating a matching degree between the current behavior and the profile result. When the matching degree is lower than a preset matching degree, the second device considers that the credibility of the first device decreases. At this time, the second device sends instruction information to the first device, so as to instruct the first device to re-obtain the authorization of the second device.

Correspondingly, after receiving the instruction information, the first device can return to perform the above-mentioned steps 201 to 204 to re-obtain the authorization of the second device, so as to continue to access the information on the second device.

In some embodiments, the purpose of continuous authentication between devices can be achieved. In other words, the device requested for access continues to be suspicious of the requesting device, and once it is determined that the credibility of the requesting device decreases, the requesting device can be required to obtain authorization again, so as to improve the security and reliability of information interaction across smart devices.

The information interaction method according to the present disclosure will be described below from the second device side.

Figure 4:
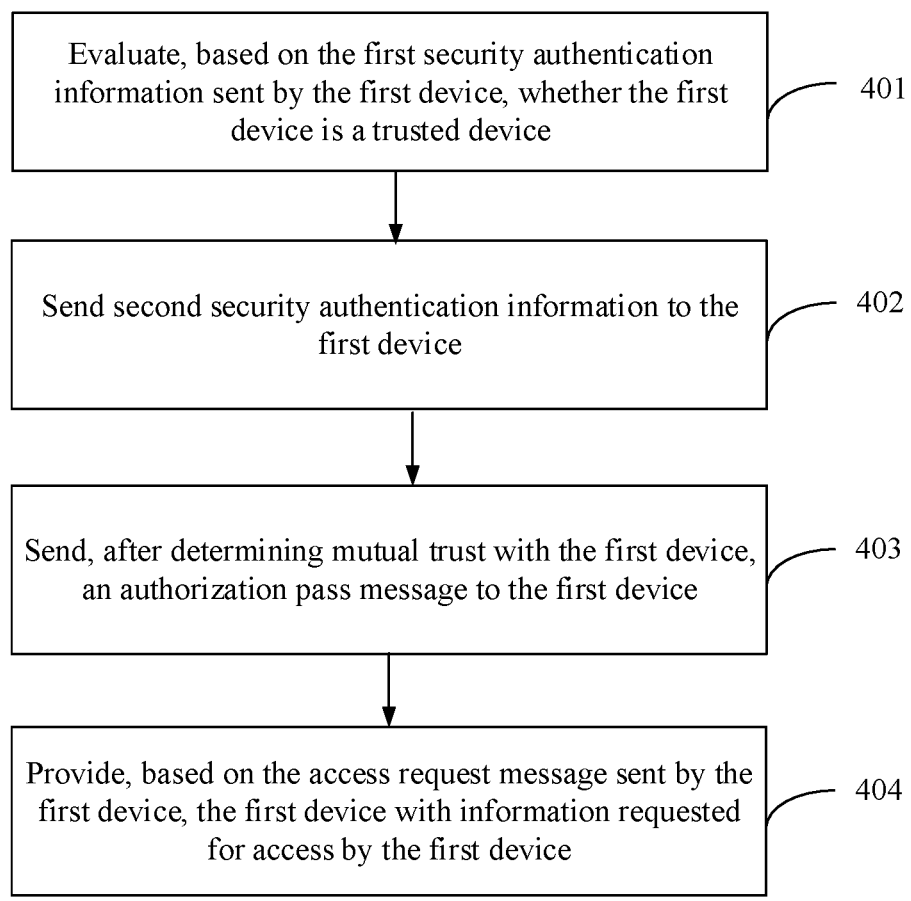
FIG. 4 is a flowchart of another information interaction method according to an embodiment of the present disclosure.

Referring to FIG. 4, FIG. 4 is a flowchart of an information interaction method illustrating an embodiment of the present disclosure. This embodiment is described from the second device side. The second device is a device requested for access, which may include but not limited to a mobile phone, a laptop, a desktop computer, a tablet computer and the like. As shown in FIG. 4, the information interaction method may include the following steps.

In step 401, based on the first security authentication information sent by the first device, it is evaluated whether the first device is a trusted device.

In some embodiments of the present disclosure, the first security authentication information is used by the second device to evaluate whether the first device is a trusted device.

In some examples, the second device and the first device need to perform signature verification on each other first, and then evaluate whether the first device is a trusted device if both signature verifications pass.

For example, the second device may send second signature information to be verified to the first device, and the second signature information to be verified is used by the first device to obtain a second signature verification result by performing signature verification on the second device.

In some embodiments, the second signature information to be verified includes: a second challenge value randomly generated by the second device; and a second signature value signed by the second device.

For example, the second device obtains the second signature value signed by the second device by signing the randomly generated second challenge value based on its own root certificate.

The process of the first device determining the second signature verification result has been introduced on the first device side and will not be repeated here.

In addition, the second device may obtain a first signature verification result by performing signature verification on the first device based on first signature information to be verified sent by the first device.

In some embodiments, the first signature information to be verified includes: a first challenge value randomly generated by the first device; and a first signature value signed by the first device.

For example, the first device obtains the first signature value signed by the first device by signing the randomly generated first challenge value based on its own root certificate.

The signature verification process on the first device may include: decrypting the first signature value signed by the first device based on a public key of the first device to obtain a decrypted first signature value; and, if the decrypted first signature value is completely consistent with a first challenge value sent by the first device, determining that the first signature verification result passes, that is, the first challenge value has not been tampered with.

Further, when the second signature verification result obtained by the first device also passes, that is, when the second challenge value randomly generated by the second device has not been tampered with, the second device can evaluate, based on the first security authentication information sent by the first device, whether the first device is a trusted device.

In some embodiments, the first security authentication information includes: a second challenge value; and first trust state information of the first device.

For example, the second device may send the first trust state information to a second application on the second device, and the second application evaluates whether the first device is a trusted device based on the first trust state information, where the second application is an application requested for access.

The manner in which the second device evaluates whether the first device is a trusted device is similar to the manner in which the first device evaluates whether the second device is a trusted device, and will not be repeated here.

In some examples, the first device sends the first security authentication information and information generated by signing the first security authentication information signed at the first device.

The second device may decrypt the first security authentication information signed by the first device based on the public key of the first device. If the decrypted first security authentication information is consistent with the first security authentication information sent by the first device, it determines that the first security authentication information has not been changed. Then the second device can evaluate whether the first device is a trusted device based on the first security authentication information.

In step 402, second security authentication information is sent to the first device.

In some embodiments of the present disclosure, the execution order of step 401 and step 402 is not limited.

In some embodiments of the present disclosure, the second security authentication information is used by the first device to evaluate whether the second device is a trusted device.

In some embodiments of the present disclosure, the second device may obtain the second security authentication information by combining the first challenge value with the second trust state information of the second device.

In some embodiments, the second trust state information includes but is not limited to the root of the second device, the number of flashes, the security state of the second device, and the like.

Further, the second device sends the generated second security authentication information to the first device, so that the first device evaluates whether the second device is a trusted device.

In some examples, in order to improve the security of the second security authentication information, the second security information may be signed again based on the root certificate of the second device, and the second security authentication information is sent to the first device along with and the signed second security authentication information.

In step 403, after determining mutual trust with the first device, an authorization pass message is sent to the first device.

In some embodiments of the present disclosure, the second device determines that the first device is a trusted device after the evaluation, and the first device determines that the second device is a trusted device after the evaluation. Then the second device can send the authorization pass message to the first device.

In some embodiments of the present disclosure, the authorization message is used to authorize the first device to access the second device.

In step 404, based on the access request message sent by the first device, the first device is provided with information requested for access by the first device.

For example, the access request message may request access to pictures, files, other data information, and the like on the second device.

In some embodiments, devices can exchange security authentication information to authenticate whether the peer device is a trusted device. After the devices trust each other, the device requested for access sends authorization pass message to the device initiating the access request message, so as to improve the trust level of security state between devices, keeping the trust level of both devices at a higher level, and ensuring the security and reliability of information interaction across smart devices.

Figure 5:
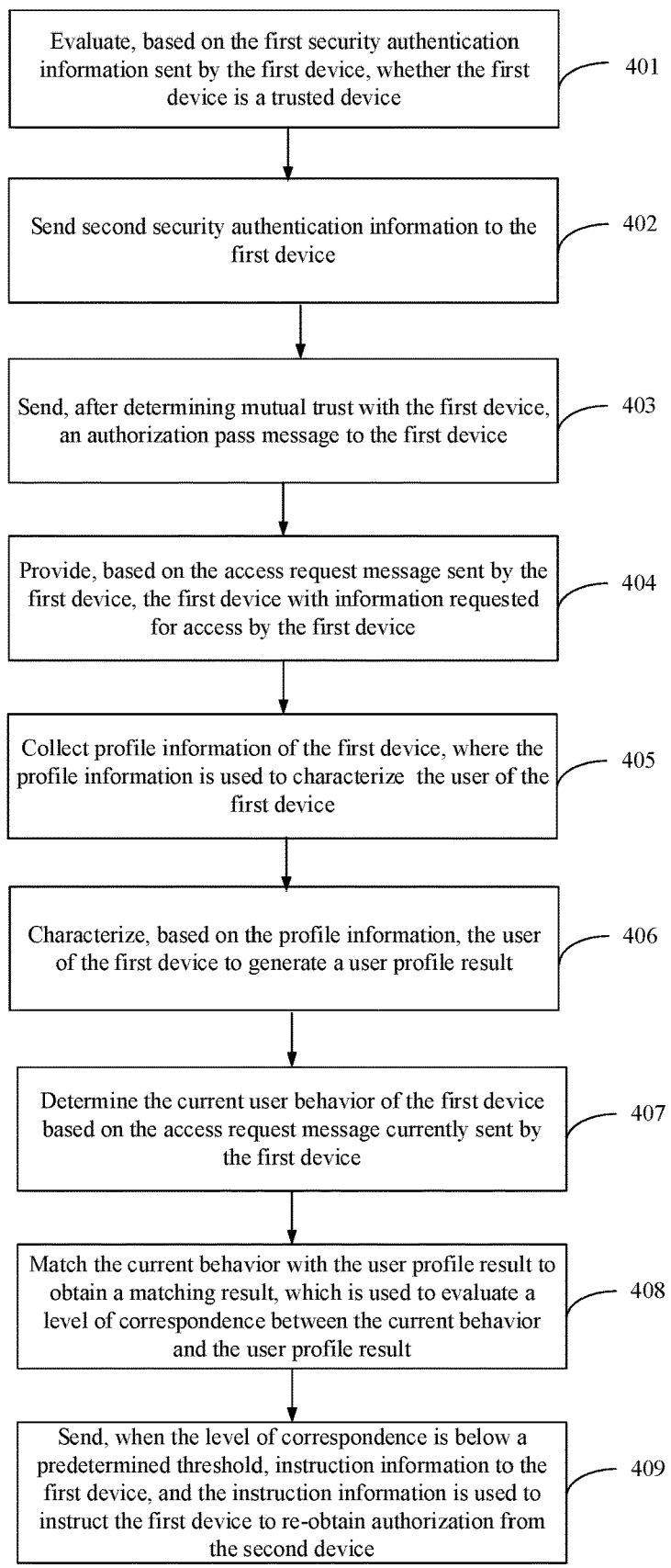
FIG. 5 is a flowchart of another information interaction method according to an embodiment of the present disclosure.

In some embodiments, refer to FIG. 5, which is a flowchart of an information interaction method according to some embodiments of FIG. 4 in the present disclosure. The information interaction method may also include the following steps.

In step 405, profile information of the first device is collected, where the profile information is used to profile the user of the first device.

In some embodiments of the present disclosure, the second device can continuously collect profile information of the first device. The profile information may include but not limited to the clicking habits, usage habits, and the like of the user of the first device.

In step 406, based on the profile information, the user of the first device is profiled to obtain a user profile result.

In some embodiments of the present disclosure, Internet user sample profile information may be collected to train an initial neural network, so as to obtain a neural network for user profiling. The neural network may later be used as a profiling engine to profile the users.

After collecting the above profile information, it may be input into the neural network to obtain the user profile result output by the neural network. The profile result may represent user characteristics such as the user's usage habits, clicking habits, and the like of the first device.

In step 407, the current user behavior of the first device is determined based on the access request message currently sent by the first device.

In some embodiments of the present disclosure, the current user behavior of the first device can be obtained through a separate user behavior analysis model.

In step 408, the current behavior is matched with the user profile result to obtain a matching result, which is used to evaluate a matching degree between the current behavior and the user profile result.

In some examples, the matching degree may be expressed as a score. The higher the score, the better the matching.

In step 409, when the matching degree is lower than a preset matching degree, instruction information is sent to the first device, and the instruction information is used to instruct the first device to re-obtain authorization from the second device.

In some examples, preset matching degrees, serving as thresholds, may be configured in advance for different services. When the matching degree is lower than the preset matching degree, the first device needs to be triggered to re-obtain authorization from the second device.

For example, services and corresponding preset matching degrees may be as shown in Table 1.

TABLE 1

| Services | Corresponding preset matching degrees |
|---|---|
| Password Payment | 80 |
| Camera Viewing | 60 |
| Webpage browsing | 60 |
| ... | ... |

It is understood that the preset matching degree can be configured flexibly.

For example, when the second device determines that a matching degree of password payment is higher than 80 points, it allows the first device to access normally. If the matching degree is lower than 80 points, the first device needs to obtain authorization again.

In some examples, if the matching degree is too low, the first device may also be prohibited from accessing the application corresponding to the second device. Table 1 is further expanded to obtain Table 2.

TABLE 2

| Services | Corresponding Preset Matching Degrees | Access Prohibition Matching Degrees |
|---|---|---|
| Password Payment | 80 | 60 |
| Camera Viewing | 60 | 20 |
| Webpage browsing | 60 | 0 |
| ... | ... | ... |

For example, when the second device determines that a matching degree of password payment is higher than 80 points, it allows the first device to access normally. If the matching degree is between 60 and 80 points, the first device needs to obtain authorization again. If the matching degree is lower than 60 points, the second device will no longer allow the first device to access the password payment application.

In some embodiments, the purpose of continuous authentication between devices can be achieved. In other words, the device requested for access continues to be suspicious of the requesting device, and once it is determined that the credibility of the requesting device decreases, the requesting device can be required to obtain authorization again, so as to improve the security and reliability of information interaction across smart devices.

The above process is further illustrated below with examples.

Embodiment 1 is an initial authorization phase between the first device and the second device.

When calling functions such as connection matching, data transmission, and function calling for the first time, the trust state information of both parties' devices is obtained to improve the mutual trust level of both parties.

Figure 6A:
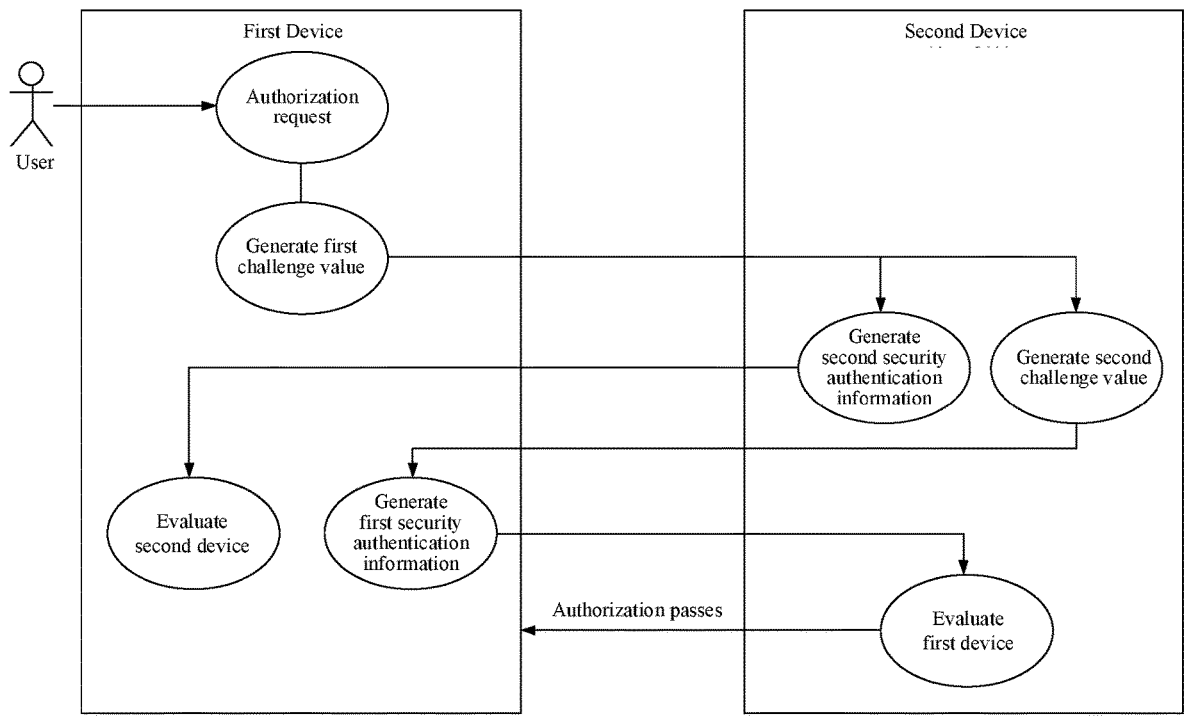
FIGS. 6A-6C are flowcharts of an information interaction method according to an embodiment of the present disclosure.

An illustrative flow of the initial authorization phase is shown in FIG. 6A.

First, a challenge value is generated.

The challenge value is to be generated for each authorization and provided to the other party. The other party generates trust state information based on the challenge value to prevent replay attack.

Figure 6B:
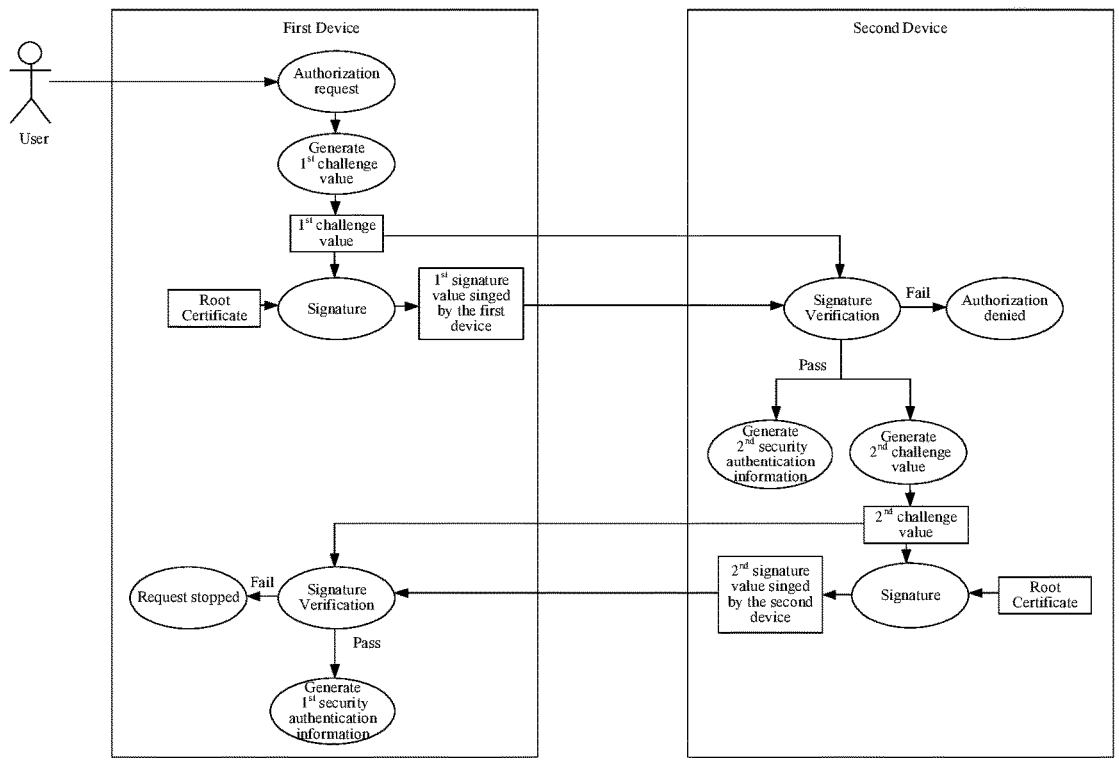

For example, as shown in FIG. 6B, the user requests access to the second device through the first device. The first device may generate a fixed-length first challenge value, assumed as challenge1, and use the root certificate of the first device to sign it. After being signed by the first device, the first signature value is challenge1_sign. The challenge1 and challenge1_sign are sent to the second device as the first signature information to be verified.

The second device obtains challenge1 and challenge1_sign for signature verification. If the signature verification passes/succeeds, it means that challenge1 has not been tampered with. If it is tampered with, authorization will be denied.

If challenge1 has not been tampered with, the second device may generate a fixed-length second challenge value, assumed as challenge2, and sign it using the root certificate of the second device. The second signature value signed by the second device is challenge2_sign. The challenge2 and challenge2_sign are sent to the first device as the second signature information to be verified. The second security authentication information trust_state_info2 is further generated based on challenge1.

The first device obtains challenge2 and challenge2_sign to for signature verification. If the signature verification passes, it means that challenge2 has not been tampered with. If it is tampered with, the request will be stopped.

If challenge2 has not been tampered with, challenge2 is further used to generate the first security authentication information trust_state_info1.

Secondly, the security authentication information trust_state_info is generated.

The device trust state system is relied on to generate device state information with a higher trust level and improve the mutual trust level of both parties.

Figure 6C:
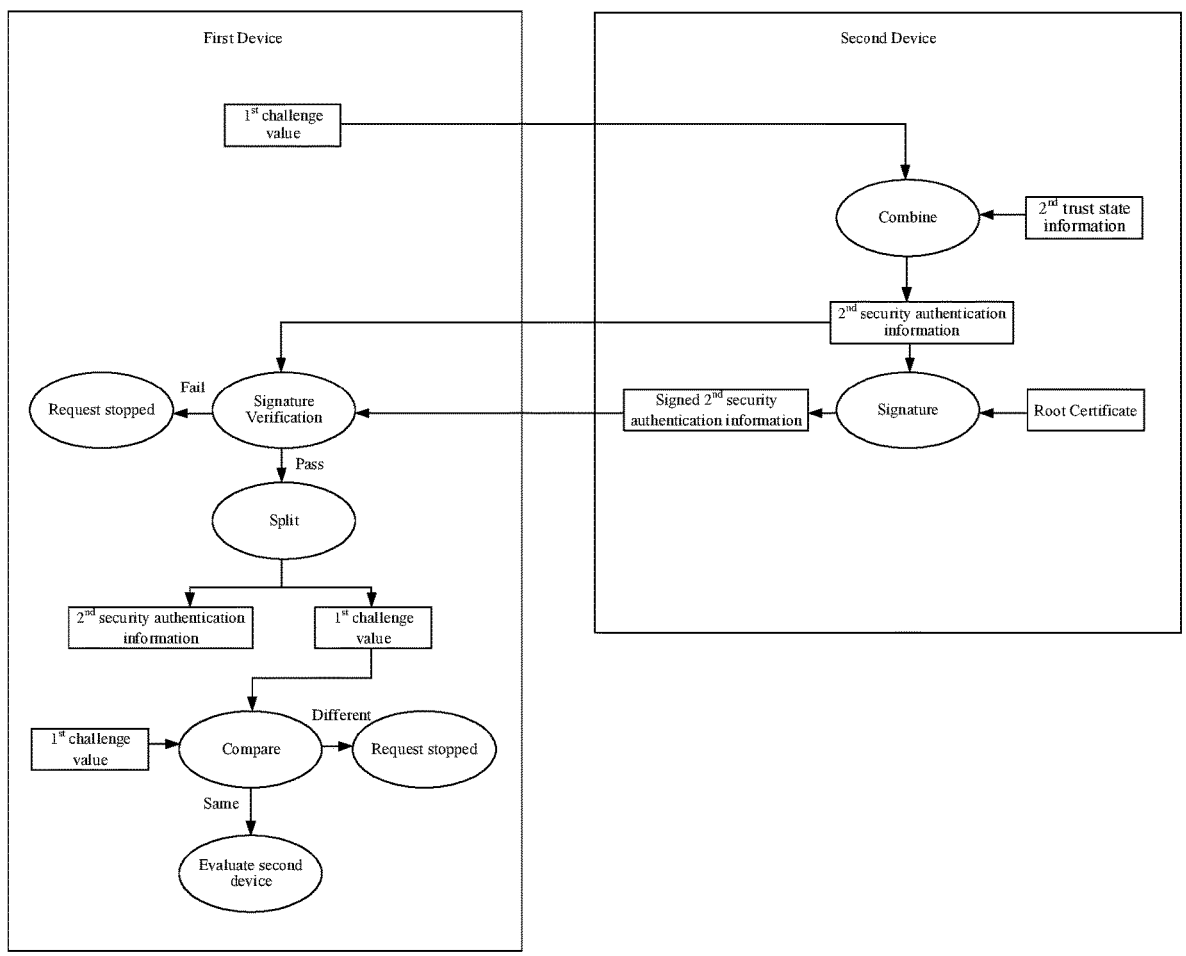

For example, as shown in FIG. 6C, after obtaining the first challenge value challenge1 of the first device, the second device combines challenge1 with its own second trust state information to obtain the second security authentication information trust_state_info2, and signs it with the root certificate of the second device, deriving a signature value trust_state_info2_sign. Both trust_state_info2 and trust_state_info2_sign are sent to the first device.

The first device obtains trust_state_info2 and trust_state_info2_sign for signature verification. If the signature verification passes, it means that trust_state_info2 has not been tampered with. If it is tampered with, the request will be stopped.

The challenge1 in trust_state_info2 is compared with the challenge 1 sent by the first device. If the values are consistent, it means there is no replay attack. If the values are inconsistent, it means there is a replay attack, and the request will be stopped.

If trust_state_info2 has not been tampered with and there is no replay attack, it is further used to evaluate the second device.

In the same way, after the first device obtains challenge2 of the second device, it may also generate trust_state_info1 and trust_state_info1_sign and send them to the second device for evaluation. The specific content is basically symmetrical to the process in the above drawings and will not be repeated here.

Again, the other party's device is evaluated.

The security of the other party's device at this moment is evaluated based on the trust state information provided by the other party's device. Risk judgment is to be made by different services based on needs.

The first device obtains the second security authentication information trust_state_info2 of the second device and provides the information to a specific service application, for example, a first application, which is to determine whether the second device is a trusted device.

The second device obtains the first security authentication information trust_state_info1 of the first device and provides the information to a specific service application, for example, a second application, which is to determine whether the first device is a trusted device.

If both parties trust each other, the second device sends the authorization pass message to the first device.

Embodiment 2 is a continuous authorization phase.

After the first device has obtained authorization for the first time, in order to continue to be "suspicious" of the security of the other device, the abnormality is to be discovered and interrupted in the shortest possible time.

Figure 7A:
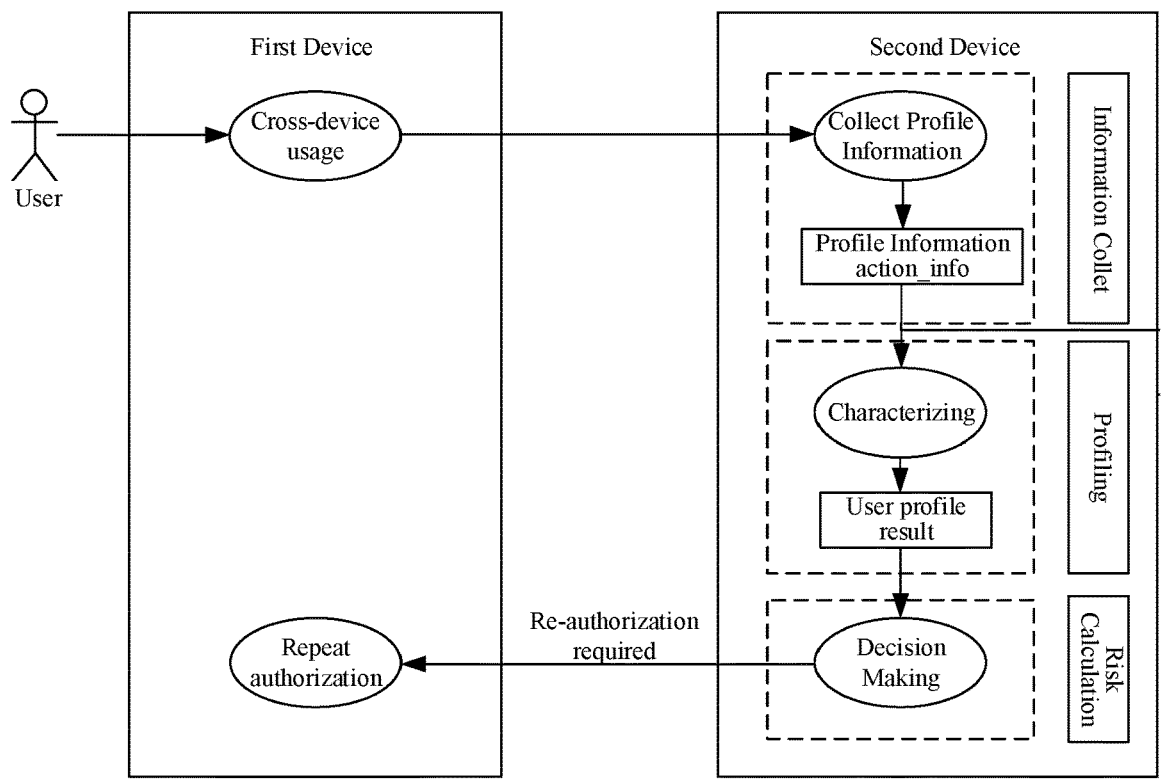
FIGS. 7A-7B are flowcharts of an information interaction method according to an embodiment of the present disclosure.

For example, as shown in FIG. 7A, firstly, information collection is performed.

Firstly, information is collected for subsequent formation of data profile.

When the first device obtains authorization and begins to access the second device normally, the second device begins to continuously collect the profile information action_info. The profile information action_info is directly passed to the profiling layer without being retained.

Secondly, profiling is performed.

The user profile of the first device is profiled. The user profile result may represent the user's behavioral habits and be used for decision.

The profile information action_info is passed to the profiling layer. According to specific data of the profile information action_info, the user profile result is formed through a profiling engine, so that the user profile result has characteristics that represent the user's usage habits.

The profiling engine calculates a model based on machine learning capabilities, intelligently analyzes user behavior patterns, categorizes user behaviors, and outputs the user profile.

Thirdly, risk calculation is performed.

The matching degree between the current user behavior of the first device and the user profile result is continuously determined, so as to make risk judgments based on different services.

Figure 7B:
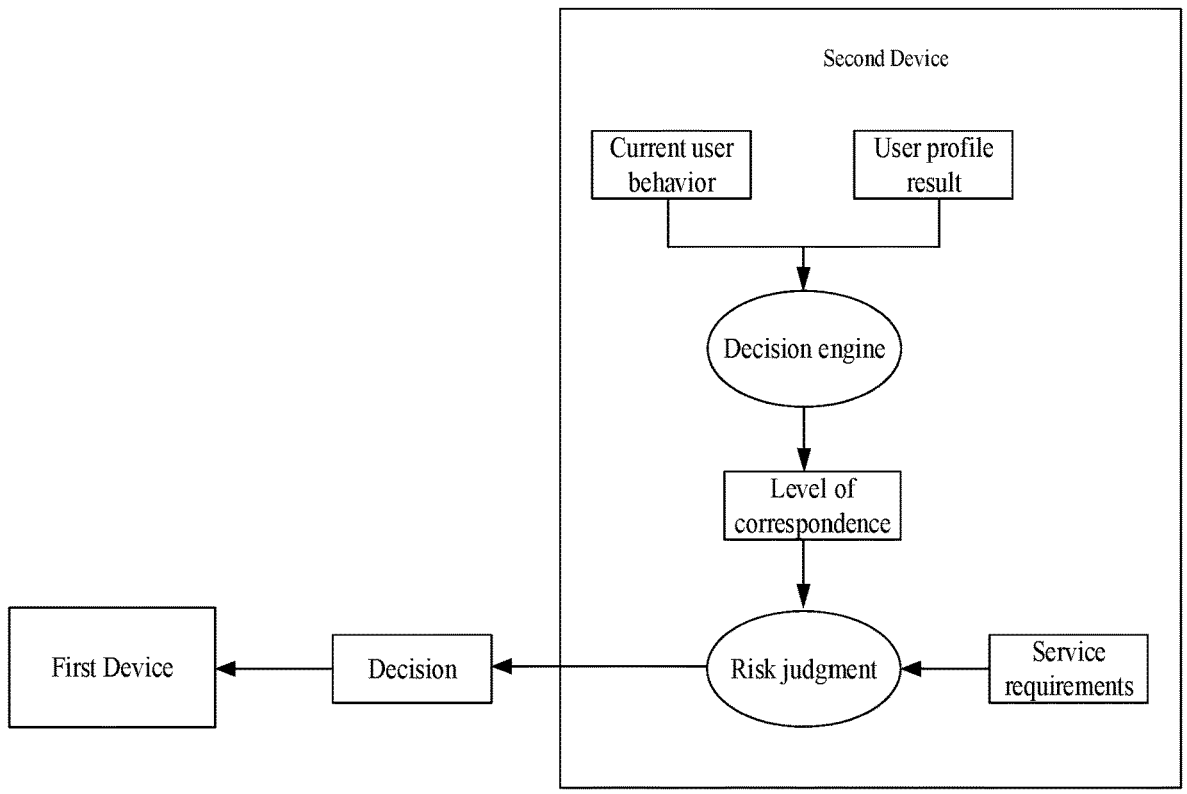

For example, as shown in FIG. 7B, the user's profile information action_info at the moment and the user profile result are passed to a decision engine of indicator calculation, so as to calculate the matching degree obtain a matching score (assuming that the full score is 100), which is used to represent the matching degree between the user who accesses the second device through the first device at this moment and the user who previously accessed the second device. This matching score can provide a basis for identity authentication.

The decision engine calculates the model based on machine learning capabilities, distinguishes the user's regular behavior and the information action_info at the moment, and obtains a matching score.

The matching score and service requirements are passed to the risk judgment module. If it is determined that there is a risk, decisions will be made in the shortest possible time, such as interrupting services, requesting re-authorization, and the like.

The service requirements correspond to requirements on the matching score of different services, and the content of judgment decisions, which are configured for different services and are not limited in the present disclosure, for example, as shown in Table 1 or Table 2.

In some embodiments, the trust level of the security state between devices is improved, so that the trust level of the devices on both sides is at a higher level, which improves the security and reliability of information interaction across smart devices.

In Embodiment 3, the above solution according to the present disclosure can be applied to a variety of scenarios, including but not limited to any of the following scenarios.

Scenario 1 is cross-device access.

For example, when user A is using the first device and wants to share photos and files stored on the second device (the second device may be another device of user A or a device of another user with a close relationship) to others through the first device. At this time, user A does not need to get close to the second device or operate the second device to obtain photos, files, and the like on the second device. Instead, user A can initiate an authorization request process to the second device through the first device, including passing the first security authentication information to the second device. After receiving the first security authentication information, the second device may also send the second security authentication information to the first device. After the two devices trust each other through the bottom layers of systems, the first device can obtain the authorization pass message of the second device, and access photos, files, and the like on the second device based on the message.

For another example, when using the first device, user A wants to purchase a certain commodity or equity, but the balance in the payment wallet is not enough to purchase the commodity or equity. User A can initiate an authorization request process to the second device (the second device may be another device of user A or a device of another user with a close relationship) through the first device, including passing the first security authentication information to the second device. After receiving the first security authentication information, the second device may also send the second security authentication information to the first device. After the two devices trust each other through the bottom layers of systems, the first device can obtain the authorization pass message of the second device, and purchase the commodity or equity by accessing the payment wallet on the second device based on the message.

In some embodiments, after the second device provides the first device with the information requested for access by the first device, the second device may continuously collect profile information of the first device, profile the user of the first device, and obtain the user profile result.

For example, the user profile result indicates that the user is most interested in the photos of people in the album. At a certain moment, the second device receives an access request from the first device, requesting access to the payment wallet on the second device. If the second device determines that the matching degree between the first device's current service and the previous user profile result is low, for example, if the score is 40 points, then the second device believes that the credibility of the first device has declined and, thus, triggers the first device to re-obtain the authorization of the second device. The first device can send the first security authentication information to the second device again. After receiving it, the second device can also send the second security authentication information to the first device. After the two devices trust each other through the bottom layer of the system, the first device can obtain the authorization pass message from the second device and access to the payment wallet on the second device based on the message.

The above is only an illustrative description, and any cross-device access solution to obtain information on the second device should fall within the protection scope of the present disclosure.

Scenario 2 is smart home control.

In some embodiments of the present disclosure, the first device may be user A's terminal device, and the second device may be a smart home device.

Assume that the first device is user A's mobile phone, and the second device is a smart door lock in a smart home system. When someone knocks on the door, the mobile phone and the smart door lock can interact using the solution according to the present disclosure, so that the mobile phone can obtain authorization of the smart door lock. Further, user A can request access to the camera on the smart door lock through his mobile phone in order to confirm the person outside the door. Furthermore, when user A decides to open the door for that person, user A can access the control program of the smart door lock through his mobile phone, so to automatically open the door.

For another example, the first device may be one smart home device, and the second device may be another smart home device.

For example, the first device is a smart housekeeper device among smart home devices, and the second device is a smart air conditioner, smart TV, smart rice cooker, and the like.

Both smart home devices can use the solution according to the present disclosure to perform mutual authentication, and then access or control the second device through the first device after determining that they are both trusted devices.

Similarly, the smart home device as the second device profiles the user of the first device, matches the current behavior with the user profile result, and obtains the matching result. If the matching degree is poor, the second device may trigger the first device to initiate the authorization request process again.

Scenario 3 is the control of remote unmanned driving equipment.

In some embodiments, the unmanned driving equipment may be drones, unmanned vehicles, and the like.

The first device may be a terminal device for maintenance personnel, and the second device may be an unmanned driving equipment. For example, if a certain unmanned driving equipment fails, the maintenance personnel do not need to go to the fault site. Instead, the maintenance personnel's terminal device and the unmanned driving equipment can mutually authenticate each other. After confirming mutual trust, the terminal device can obtain authorization of the unmanned driving equipment, so as to access the control unit of the unmanned driving equipment and obtain relevant data of the control unit to be displayed on the screen of the terminal device, so that the maintenance personnel can confirm the cause of the fault.

Further, the unmanned driving equipment can profile the user of the first device. For example, the user profile result indicates that the user tends to obtain the fault data recorded in the control unit. Assuming that the unmanned driving equipment receives access information from the first device, requesting access to the engine and other functional modules of the unmanned driving equipment, the unmanned driving equipment can evaluate the matching degree between the user of the first device and the user before this moment. If the matching degree is considered to be low at this time, the unmanned driving device can trigger the first device to initiate the authorization request process again.

The above is only an illustrative description, and the solution of the present disclosure can be applied to various other scenarios that require cross-device authorization and authentication.

In addition, it should be noted that the first device can obtain identification information of the second device in advance, such as the physical address of the second device, so as to output a list of accessible devices of the first device.

For example, the first device may output the list by searching for nearby devices through Bluetooth, infrared, wireless fidelity (WIFI), and the like.

When the user selects a device in the list of accessible devices, the device may be considered the second device. At this time, the first device can initiate the authorization request process to the second device.

When the second device determines that the reliability of the first device has declined and triggers the first device to initiate the authorization request process multiple times within a preset period, the first device may delete the second device from the list of accessible devices, or the second device may add the first device to a list of insecurity devices. The security of cross-device access can be further improved. Corresponding to the foregoing embodiments of the method for implementing the application function, the present disclosure also provides embodiments of the apparatus for implementing the application function.

Figure 8:
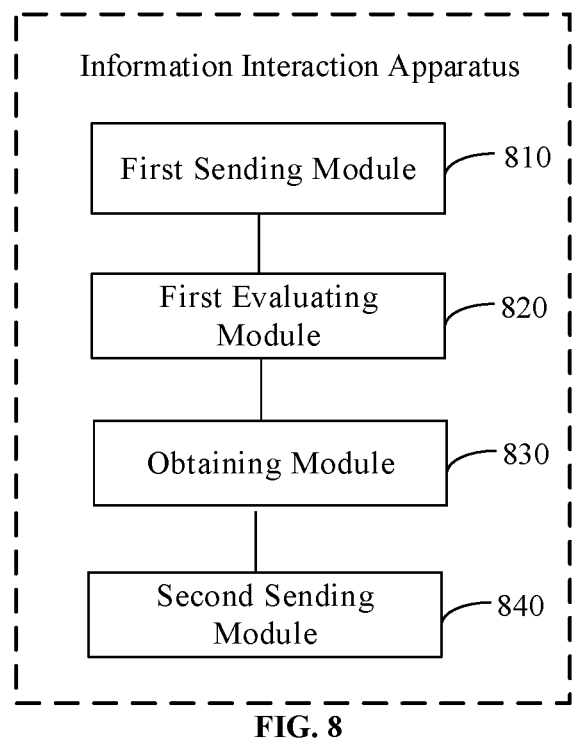
FIG. 8 is a block diagram of an information interaction apparatus according to an embodiment of the present disclosure.

Referring to FIG. 8, FIG. 8 is a block diagram of an information interaction apparatus according to an embodiment of the present disclosure. The apparatus includes: a first sending module 810, configured to send, in response to a need to send an authorization request message to a second device, first security authentication information to the second device, where the first security authentication information is configured for the second device to evaluate whether a first device is a trusted device; a first evaluating module 820, configured to evaluate whether the second device is a trusted device based on second security authentication information sent by the second device; an obtaining module 830, configured to obtain, in response to determining mutual trust with the second device, an authorization pass message sent by the second device based on the authorization request message, where the authorization pass message is configured to authorize the first device to access the second device; and a second sending module 840, configured to send an access request message to the second device based on the authorization pass message, so as to request access to information on the second device.

Figure 10:
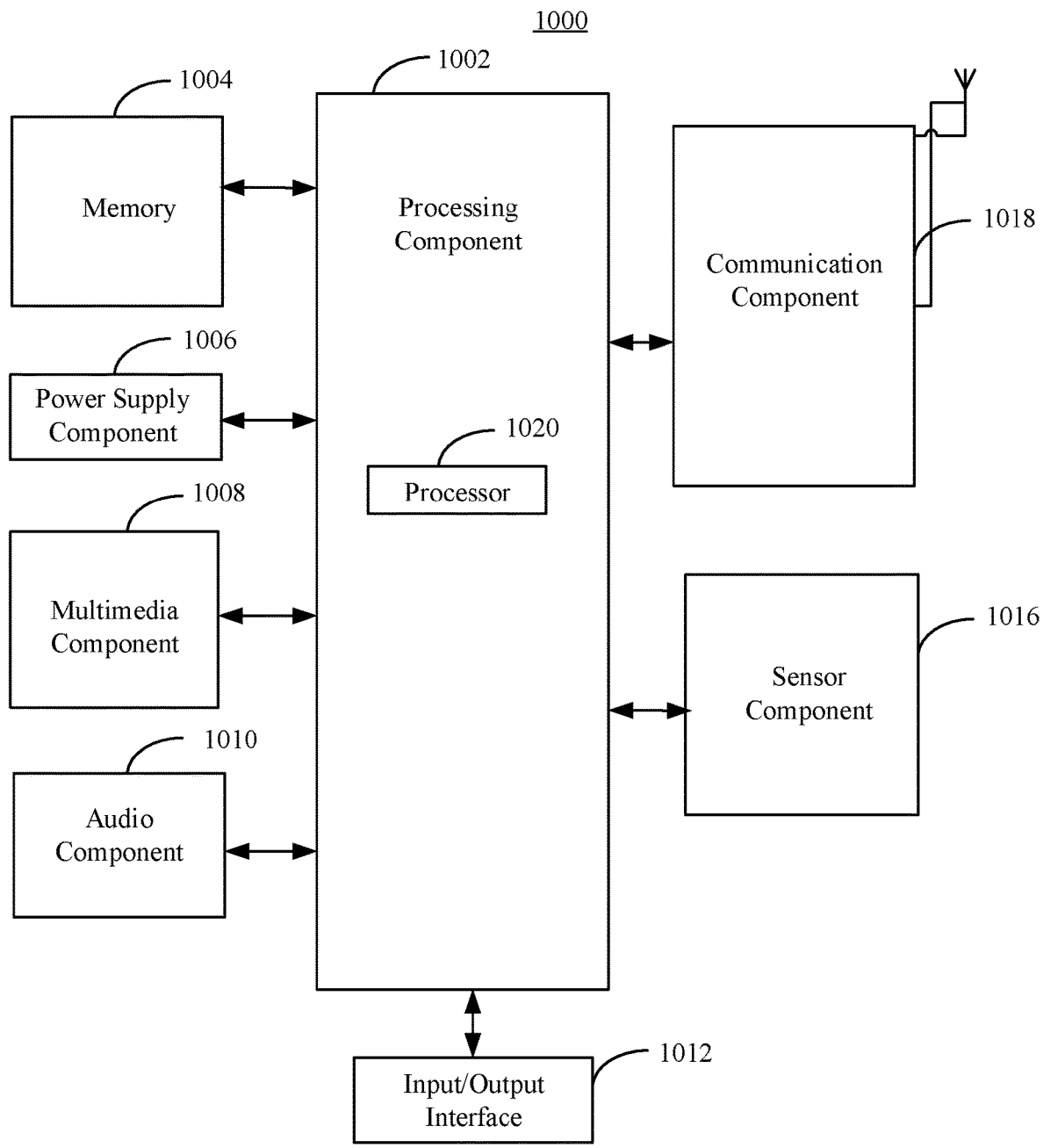
FIG. 10 is a schematic diagram of an information interaction apparatus according to an embodiment of the present disclosure.

In some embodiments, the first sending module 810, the obtaining module 830 and the second sending module 840 may be implemented by a transceiver, for example, the communication component 1018 as shown in FIG. 10; and the first evaluating module 820 may be implemented by a processor, for example, the processor 1020 as shown in FIG. 10.

Figure 9:
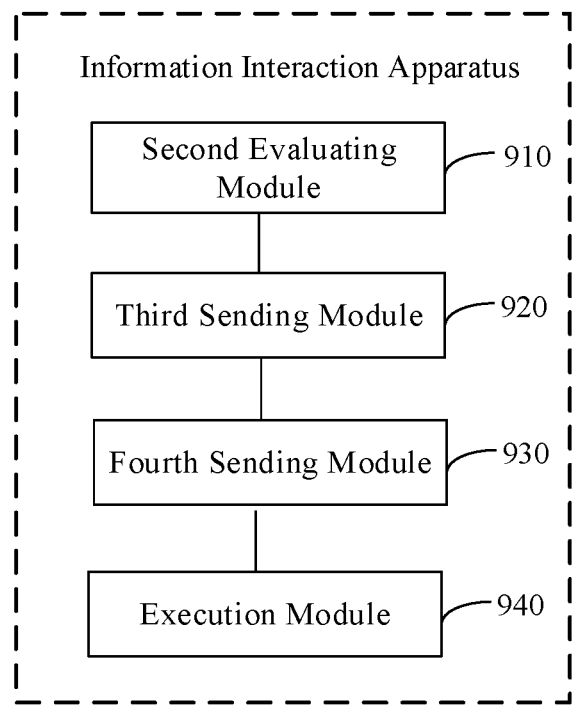
FIG. 9 is a block diagram of another information interaction apparatus according to an embodiment of the present disclosure.

Referring to FIG. 9, FIG. 9 is a block diagram of an information sending apparatus according to an embodiment of the present disclosure. The apparatus includes: a second evaluating module 910, configured to evaluate whether a first device is a trusted device based on first security authentication information sent by the first device; a third sending module 920, configured to send second security authentication information to the first device, and the second security authentication information is configured for the first device to evaluate whether the second device is a trusted device; a fourth sending module 930, configured to send, in response to determining mutual trust with the first device, an authorization pass message to the first device, and the authorization pass message is configured to authorize the first device to access the second device; and an execution module 940, configured to provide, based on an access request message sent by the first device, the first device with information requested for access by the first device.

In some embodiments, the second evaluating module 910 may be implemented by a processor, for example, the processor 1020 as shown in FIG. 10; and the third sending module 920, the fourth sending module 930 and the execution module 940 may be implemented by a transceiver, for example, the communication component 1018 as shown in FIG. 10.

As for the apparatus embodiments, since they basically correspond to the method embodiments, the description of the method embodiments can be referred to for relevant details. The apparatus embodiments described above are only illustrative. Persons of ordinary skill in the art can understand and implement the solution without any creative effort.

Correspondingly, the present disclosure also provides a non-transitory computer-readable storage medium for storing a computer program, where the processor is configured to, upon executing the computer program, implement steps of any embodiment of the above information interaction methods.

Correspondingly, the present disclosure also provides an information interaction apparatus, including: a processor; and a memory, configured to store instructions executable by the processor; where the processor is configured to, upon executing the executable instructions, implement steps of any embodiment of the above information interaction methods.

FIG. 10 is a block diagram of an information interaction apparatus according to an embodiment of the present disclosure. For example, the device 1000 may be a mobile phone, a computer, a digital broadcast terminal, a messaging device, a game console, a tablet device, a medical device, a fitness device, a personal digital assistant and other terminal devices. The terminal device may be the first device or the second device.

Referring to FIG. 10, the device 1000 may include one or more of the following components: a processing component 1002, a memory 1004, a power supply component 1006, a multimedia component 1008, an audio component 1010, an input/output (I/O) interface 1012, a sensor component 1016, and a communication component 1018.

The processing component 1002 generally controls the overall operations of device 1000, such as operations associated with display, phone calls, data communications, camera operations, and recording operations. The processing component 1002 may include one or more processors 1020 to execute instructions to complete all or part of the steps of the above method. Additionally, the processing component 1002 may include one or more modules that facilitate interaction between the processing component 1002 and other components. For example, the processing component 1002 may include a multimedia module to facilitate interaction between the multimedia component 1008 and the processing component 1002.

One of processors 1020 in the processing component 1002 may be configured to perform any embodiment of the information interaction method described above.

The memory 1004 is configured to store various types of data to support operations at device 1000. Examples of such data include instructions for any application or method operating on device 1000, contact data, phonebook data, messages, pictures, videos, and the like. The memory 1004 may be implemented by any type of volatile or non-volatile storage device, or a combination of volatile and non-volatile device, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk.

The power supply component 1006 provides power to various components of device 1000. The power supply components 1006 may include a power management system, one or more power supplies, and other components associated with generating, managing, and distributing power to device 1000.

The multimedia component 1008 includes a screen that provides an output interface between device 1000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. A touch sensor can not only sense the boundaries of a touch or swipe action, but also detect the duration and pressure associated with the touch or swipe action. In some embodiments, the multimedia component 1008 includes a front camera and/or a rear camera. When the device 1000 is in an operating mode, such as a shooting mode or a video mode, the front camera and/or the rear camera may receive external multimedia data. Each front camera and rear camera may be a fixed optical lens system or have a focal length and optical zoom capabilities.

The audio component 1010 is configured to output and/or input audio signals. For example, the audio component 1010 includes a microphone (MIC) configured to receive external audio signals when device 1000 is in operating modes, such as call mode, recording mode, and speech recognition mode. The received audio signals may be further stored in memory 1004 or sent via the communication component 1018. In some embodiments, the audio component 1010 also includes a speaker for outputting audio signals.

The I/O interface 1012 provides an interface between the processing component 1002 and a peripheral interface module. The peripheral interface module may be a keyboard, a click wheel, a button, and the like. These buttons may include, but are not limited to, a Home button, volume buttons, a start button, and a lock button.

The sensor component 1016 includes one or more sensors for providing various aspects of state assessment for device 1000. For example, the sensor component 1016 can detect the on/off state of the device 1000, the relative positioning of components, such as the display and keypad of the device 1000. The sensor component 1016 can also detect the position change of the device 1000 or a component of the device 1000, the presence or absence of user contact with the device 1000, orientation or acceleration/deceleration of the device 1000 and temperature changes of the device 1000. The sensor assembly 1016 may include a proximity sensor configured to detect the presence of nearby objects without any physical contact. The sensor assembly 1016 may also include a light sensor, such as a CMOS or CCD image sensor, for use in imaging applications. In some embodiments, the sensor component 1016 may also include an acceleration sensor, a gyroscope sensor, a magnetic sensor, a pressure sensor, or a temperature sensor.

The communication component 1018 is configured to facilitate wired or wireless communication between the device 1000 and other devices. The device 1000 can access a wireless network based on a communication standard, such as WiFi, 3G, 4G, 5G, 6G or any combination thereof. In some embodiments, the communication component 1018 receives broadcast signals or broadcast related information from an external broadcast management system via a broadcast channel. In some embodiments, the communication component 1018 also includes a near field communications (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In some embodiments, the device 1000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the above method.

In some embodiments, a non-transitory computer-readable storage medium including instructions is also provided, such as a memory 1004 including instructions, which can be executed by the processor 1020 of the device 1000 to implement the above method. For example, the non-transitory computer-readable storage medium may be ROM, random access memory (RAM), CD-ROM, magnetic tape, floppy disk, optical data storage device, and the like.

The technical solutions provided by the embodiments of the present disclosure may include the following beneficial effects: devices can exchange security verification information to verify whether another device is a trusted device. After the devices trust each other, the device requested for access sends authorization information to the device that initiated the access request message, so as to improve the trust level of the security status between devices, keep the trust level of both devices at a higher level, and ensure the security and reliability of information interaction between smart devices.

It should be noted that in the present disclosure, relational terms such as "first" and "second" are only used to distinguish one entity or operation from another entity or operation, and do not necessarily require or imply that such actual relationship or sequence exists between these entities or operations. The terms "comprise," "include," or any other variation thereof are intended to cover a non-exclusive inclusion such that a process, method, article or device including a list of elements includes not only those listed elements but also others not expressly listed elements, or elements inherent to such process, method, article or device. Without further limitation, an element defined by the statement "comprises/comprising a . . . " does not exclude the presence of additional identical elements in a process, method, article, or device that includes the stated element.

Other embodiments of the disclosure will be readily apparent to those skilled in the art from consideration of the specification and practice of the disclosure herein. This application is intended to cover any variations, uses, or adaptations of the disclosure that follow the general principles of the disclosure and include common knowledge or customary technical means in the art that are not disclosed in the disclosure. It is intended that the specification and examples be considered as exemplary only, with a true scope and spirit of the disclosure being indicated by the following claims.

It is to be understood that the present disclosure is not limited to the precise structures described above and illustrated in the accompanying drawings, and various modifications and changes may be made without departing from the scope thereof. The scope of the disclosure is limited only by the appended claims.

What is claimed is:

1. An information interaction method, comprising:
    sending, by a first device in response to a need to send an authorization request message to a second device, first security authentication information to the second device, wherein the first security authentication information is configured for the second device to evaluate whether the first device is a trusted device;
    evaluating, by the first device, whether the second device is a trusted device based on second security authentication information sent by the second device;
    obtaining, by the first device in response to determining mutual trust with the second device, an authorization pass message sent by the second device based on the authorization request message, wherein the authorization pass message is configured to authorize the first device to access the second device;
    sending, by the first device, an access request message to the second device based on the authorization pass message, thereby requesting access to information on the second device;
    sending, by the first device, first signature information to the second device, wherein the first signature information is configured for the second device to obtain a first signature verification result by performing signature verification on the first device;
    obtaining, by the first device, a second signature verification result by performing signature verification on the second device based on second signature information sent by the second device;
    generating, by the first device in response to passing of both the first signature verification result and the second signature verification result, the first security authentication information; and
    generating, by the first device, the first security authentication information by combining the second challenge value with first trust state information of the first device,
    wherein the second signature information comprises: a second challenge value randomly generated by the second device;
    and a second signature value signed by the second device.

2. The method according to claim 1, wherein the first signature information comprises:
    a first challenge value randomly generated by the first device; and
    a first signature value signed by the first device.

3. The method according to claim 1, wherein the method further comprises:
    determining, in response to the second signature verification result indicating that the second challenge value has not been changed, the second signature verification result as passing verification.

4. The method according to claim 1, wherein the second security authentication information comprises:
    a first challenge value; and
    second trust state information of the second device.

5. The method according to claim 4, wherein the method further comprises:
    sending the second trust state information to a first application on the first device, wherein the first application is configured to evaluate whether the second device is the trusted device based on the second trust state information, and the first application is an application requesting access to the second device.

6. The method according to claim 4, wherein the method further comprises:
determining whether a replay attack is present by comparing the first challenge value in the second security authentication information with a first challenge value previously randomly generated by the first device.

7. The method according to claim 1, further comprising:
receiving instruction information sent by the second device, wherein the instruction information is configured to instruct the first device to re-obtain authorization from the second device.

8. An information interaction method, comprising:
evaluating, by a second device, whether a first device is a trusted device based on first security authentication information sent by the first device;
sending, by the second device, second security authentication information to the first device, wherein the second security authentication information is configured for the first device to evaluate whether the second device is a trusted device;
sending, by the second device in response to determining mutual trust with the first device, an authorization pass message to the first device, wherein the authorization pass message is configured to authorize the first device to access the second device;
providing, by the second device based on an access request message sent by the first device, the first device with information requested for access by the first device;
obtaining, by the second device, a first signature verification result by performing signature verification on the first device based on first signature information sent by the first device;
sending, by the second device, second signature information to the first device, wherein the second signature information is configured for the first device to obtain a second signature verification result by performing signature verification on the second device;
generating, by the second device in response to passing of both the first signature verification result and the second signature verification result, the second security authentication information; and
generating, by the second device, the second security authentication information by combining the first challenge value with second trust state information of the second device,
wherein the first signature information comprises: a first challenge value randomly generated by the first device; and a first signature value signed by the first device.

9. The method according to claim 8, wherein the second signature information comprises:
a second challenge value randomly generated by the second device; and
a second signature value signed by the second device.

10. The method according to claim 8, wherein the method further comprises:
determining, in response to the first signature verification result indicating that the first challenge value has not been changed, the first signature verification result as passing verification.

11. The method according to claim 8, wherein the first security authentication information comprises:
a second challenge value; and
first trust state information of the first device.

12. The method according to claim 11, further comprising:
determining whether a replay attack is present by comparing the second challenge value included in the first security authentication information with a second challenge value previously randomly generated by the second device.

13. The method according to claim 8, further comprising:
collecting profile information of the first device, wherein the profile information is configured to characterize a user of the first device;
generating a user profile result by characterizing the user of the first device based on the profile information;
determining a current behavior of the first device based on the access request message currently sent by the first device;
obtaining a matching result by matching the current behavior with the user profile result, wherein the matching result is configured to assess a level of correspondence between the current behavior and the user profile result; and
sending, in response to determining that the level of correspondence is below a predetermined threshold, instruction information to the first device, wherein the instruction information is configured to instruct the first device to re-request authorization from the second device.

14. An information interaction apparatus, comprising:
a processor; and
a memory for storing instructions executable by the processor;
wherein the processor is configured to perform acts comprising:
sending, in response to a need to send an authorization request message to a second device, first security authentication information to the second device, wherein the first security authentication information is configured for the second device to evaluate whether the first device is a trusted device;
evaluating whether the second device is a trusted device based on second security authentication information sent by the second device;
obtaining, in response to determining mutual trust with the second device, an authorization pass message sent by the second device based on the authorization request message, wherein the authorization pass message is configured to authorize the first device to access the second device; and
sending an access request message to the second device based on the authorization pass message, thereby requesting access to information on the second device;
sending first signature information to the second device, wherein the first signature information is configured for the second device to obtain a first signature verification result by performing signature verification on the first device;
obtaining a second signature verification result by performing signature verification on the second device based on second signature information sent by the second device;
generating, in response to passing of both the first signature verification result and the second signature verification result, the first security authentication information; and generating the first security authentication information by combining the second challenge value with first trust state information of the first device, wherein the second signature information comprises: a second challenge value randomly generated by the second device; and a second signature value signed by the second device.

\* \* \* \* \*